(12) United States Patent
Gobert et al.

(10) Patent No.: US 7,561,208 B2
(45) Date of Patent: Jul. 14, 2009

(54) METHOD AND DECODER FOR COMPOSING A SCENE

(75) Inventors: Jean Gobert, Maisons-Alfort (FR); Lien Nguyen-Phuc, Paris (FR)

(73) Assignee: NXP B.V., Eindhoven (NL)

( * ) Notice: Subject to any disclaimer, the term of this patent is extended or adjusted under 35 U.S.C. 154(b) by 711 days.

(21) Appl. No.: 10/561,462

(22) PCT Filed: Jun. 8, 2004

(86) PCT No.: PCT/IB2004/001999

§ 371 (c)(1),
(2), (4) Date: Dec. 20, 2005

(87) PCT Pub. No.: WO2004/114670

PCT Pub. Date: Dec. 29, 2004

(65) Prior Publication Data

US 2007/0052859 A1 Mar. 8, 2007

(30) Foreign Application Priority Data

Jun. 23, 2003 (EP) .................................. 03300036

(51) Int. Cl.
*H04N 5/74* (2006.01)
*G09G 5/00* (2006.01)

(52) U.S. Cl. .................. 348/597; 348/587; 345/639; 382/240

(58) Field of Classification Search ................. 348/587, 348/597; 345/639; 382/240
See application file for complete search history.

(56) References Cited

U.S. PATENT DOCUMENTS

| | | | | |
|---|---|---|---|---|
| 4,758,892 A | * | 7/1988 | Bloomfield | .................. 348/585 |
| 5,900,862 A | * | 5/1999 | Silverbrook et al. | ........ 345/603 |
| 6,043,824 A | * | 3/2000 | Bier | ........................... 345/630 |
| 6,072,501 A | * | 6/2000 | Bier | ........................... 345/629 |
| 6,208,693 B1 | * | 3/2001 | Chen et al. | ............. 375/240.24 |
| 6,229,930 B1 | * | 5/2001 | Kadono | ..................... 382/284 |
| 6,271,850 B1 | * | 8/2001 | Kida et al. | .................. 345/422 |

(Continued)

OTHER PUBLICATIONS

Nguyen-Phuc Q-L et al.; An MPEG-4 Renderer for High Quality Video Composition and Texture Mapping Mar. 2003, Journal of VLSI Signal Processing Systems for Signal, Image.

Szeliski R. et al., "From 2D Images to 2.5D Sprites: A Layered Approach to Modeling 3D Scenes", Multimedia Computing and Systems, 1999, CA, USA, IEEE Comput, Jun. 1999.

Houchin, J.S. et al. File format technology in JPEG 2000 enables flexible use of still and motion sequences, Signal Processing, Image Communication, vol. 17, No. 1, Jan. 2002.

*Primary Examiner*—Brian P Yenke

(57) ABSTRACT

The present invention relates to a method for composing a scene containing a plurality of objects, an object comprising chrominance and luminance components, a chrominance value being associated with a set of at least two luminance values, wherein said method comprises a step of blending a first object with a second object resulting in a blended object, said step comprising the sub-steps of:—generating a luminance component of the blended object from the corresponding luminance components of the first and second objects and from a first composition function, and—generating a chrominance component of the blended object from the corresponding chrominance components of the first and second object and from a second composition function, the second composition function depending on a set of associated values of the first composition function.

9 Claims, 3 Drawing Sheets

U.S. PATENT DOCUMENTS

| | | | |
|---|---|---|---|
| 6,317,128 B1 * | 11/2001 | Harrison et al. | 345/629 |
| 6,396,960 B1 * | 5/2002 | Yoshimura | 382/284 |
| 6,459,814 B1 * | 10/2002 | Li et al. | 382/240 |
| 6,618,444 B1 | 9/2003 | Haskell et al. | |
| 6,707,507 B2 * | 3/2004 | Lee | 348/598 |
| 7,006,155 B1 * | 2/2006 | Agarwala et al. | 348/592 |
| RE39,214 E * | 8/2006 | Gryskiewicz | 348/597 |
| 7,483,083 B2 * | 1/2009 | Li et al. | 348/673 |
| 2002/0113814 A1 * | 8/2002 | Brouard et al. | 345/723 |
| 2003/0085903 A1 * | 5/2003 | Hrusecky et al. | 345/519 |
| 2007/0120874 A1 * | 5/2007 | MacInnis et al. | 345/634 |
| 2008/0181305 A1 * | 7/2008 | Cho et al. | 375/240.12 |

\* cited by examiner

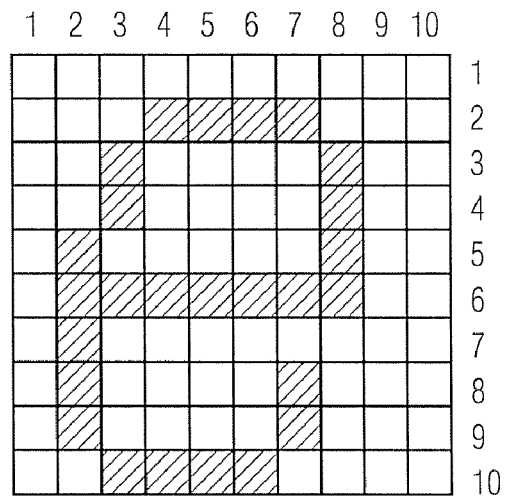
FIG. 2a ORIGINAL OBJECT
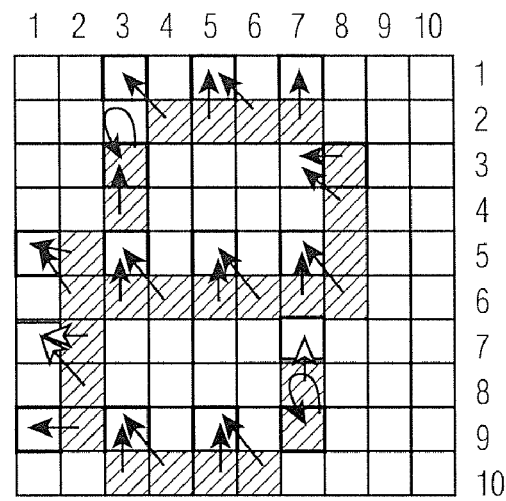
FIG. 2b GEOMETRIC TRANSFORMATION
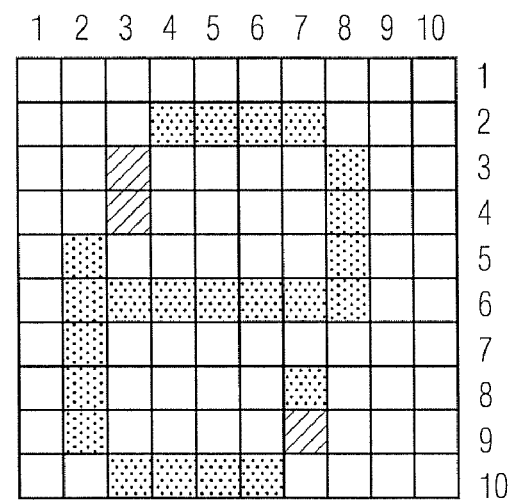
FIG. 2c BLENDED OBJECT

METHOD AND DECODER FOR COMPOSING A SCENE

FIELD OF THE INVENTION

The present invention relates to a method for composing a scene containing a plurality of objects, an object comprising chrominance and luminance components, a chrominance value being associated with a set of at least two luminance values, said method comprising a step of blending a first object with a second object resulting in a blended object.

The invention also relates to a decoder, said decoder implementing said method. Such a method may be used in, for example, a MPEG-4 video communication system.

BACKGROUND OF THE INVENTION

A visual scene can be composed of objects of different type such as natural video, two-dimensional, three-dimensional synthetic images, graphics or text.

A video communication system, like for example a mobile telecommunication system, typically comprises a first mobile phone and a second mobile phone, including an encoder and a decoder, respectively. In order to transmit a visual scene from the first mobile phone to the second mobile phone, the different objects are encoded by the first mobile phone and transmitted independently to the second mobile phone. At the decoder side the scene is recomposed by decoding the different objects and then by rendering the decoded objects. The rendering usually comprises a geometric transformation step able to map the object on the scene and a step of blending the mapped objects together, resulting in a final scene.

An object typically comprises chrominance U and V, and luminance Y components forming the color of the object. During the blending step of a current object N with an object M, a transparency value Nalpha can be associated to the object N, said transparency value influencing the chrominance and luminance values Pyuv of a blending object P such that:

$$Pyuv=[(255-Nalpha)*Myuv+Nalpha\_y*Nyuv]/255$$

The transparency of a pixel of a blended object is obtained according to the shape of said pixel. The transparency permits to determine which object is behind or in front of another object in the scene. The shape is associated with a pixel of a frame of a scene. It permits to know if a pixel is outside or inside an object. If it is outside, the shape has a null value, otherwise it has a value equal to 1.

For a pixel having coordinates (x,y), the shape value 0 or 1 corresponding to these coordinates is taken and attributed to the luminance of this pixel. In the case where the luminance values the crosses), the shape used for the chrominance value U or V(x,y) is the shape of the pixel of coordinates (2x−1, 2y−1), i.e. the top right pixel of a square of 2×2 pixels associated with the chrominance value.

One inconvenient of this solution is that the chrominance of the blended object is false. This results in a bad visual quality for objects having an arbitrary shape. This observation is illustrated in the example of an object constituted of the letter "e" and represented by stripes in FIG. 2a to 2c. FIG. 2a is the original object, FIG. 2c is the result of the composition and FIG. 2b explains how the result is obtained. Each square represents a pixel. If one takes the pixel whose coordinates are (4,2), the pixel whose shape will be used for the chrominance component is the pixel (3,1) as shown in FIG. 2b. The value of this shape is 0, that is to say it is outside the letter "e", and the chrominance value will not be taken into account, as shown in FIG. 2c where the pixel value is represented by dots. The result is false because the chrominance value should have been taken into account and the result should have been the same as in FIG. 2a.

SUMMARY OF THE INVENTION

Accordingly, it is an object of the invention to provide a method and a decoder for composing a scene containing a plurality of objects, an object comprising chrominance and luminance components, a chrominance value being associated with a set of at least two luminance values, said method comprising a step of blending a first object with a second object resulting in a blended object, which gives a better visual quality of said blended object.

To this end, there is provided a method wherein the blending step comprising the sub-steps of:

generating a luminance component of the blended object from the corresponding luminance components of the first and second objects and from a first composition function, and generating a chrominance component of the blended object from the corresponding chrominance components of the first and second object and from a second composition function, the second composition function depending on a set of associated values of the first composition function.

In addition, there is provided a decoder comprising blending means, said blending means comprising:

luminance generation means for generating a luminance component of the blended object from the corresponding luminance components of the first and second objects and from a first composition function, and chrominance generation means for a generating chrominance component of the blended object from the corresponding chrominance components of the first and second object and from a second composition function, the second composition function depending on a set of associated values of the first composition function.

As we will see in detail further on, using a set of associated values of the first composition function for the second composition function permits to have a better precision for the chrominance component of an object.

According to a first non-limited embodiment, the first composition function depends on a shape component.

In a non-limited variant of this first non-limited embodiment, a chrominance value is associated with 4 luminance values and 4 shape values, the second composition function being an 'OR' function between the 4 associated shape values.

According to a second non-limited embodiment, the first composition function is based on a transparency component.

In a non-limited variant of this second non-limited embodiment a chrominance value is associated with 4 luminance values and 4 transparency values, the second composition function being an average of the 4 transparency values.

BRIEF DESCRIPTION OF THE DRAWINGS

Additional objects, features and advantages of the invention will become apparent upon reading the following detailed description and upon reference to the accompanying drawings in which:

FIGS. 2a, 2b and 2c illustrate a result of a chrominance computation of a blended object of a scene according to the prior art.

DETAILED DESCRIPTION OF THE INVENTION

The present invention relates to a method for composing a scene, said scene containing a plurality of objects, an object comprising chrominance and luminance components, a chrominance value being associated with a set of at least two luminance values.

In the following description, the invention is depicted in the case of a video format 4:2:0, i.e. one chrominance U or V value corresponds to four luminance Y values, the chrominance being sub-sampled in the horizontal and vertical directions, but it will be apparent to a person skilled in the art that the invention is applicable to any video format in which the chrominance component is sub-sampled compared to the luminance component.

In the following description, well-known functions or constructions by a person skilled in the art are not described in detail since they would obscure the invention in unnecessary detail.

Figure 1:
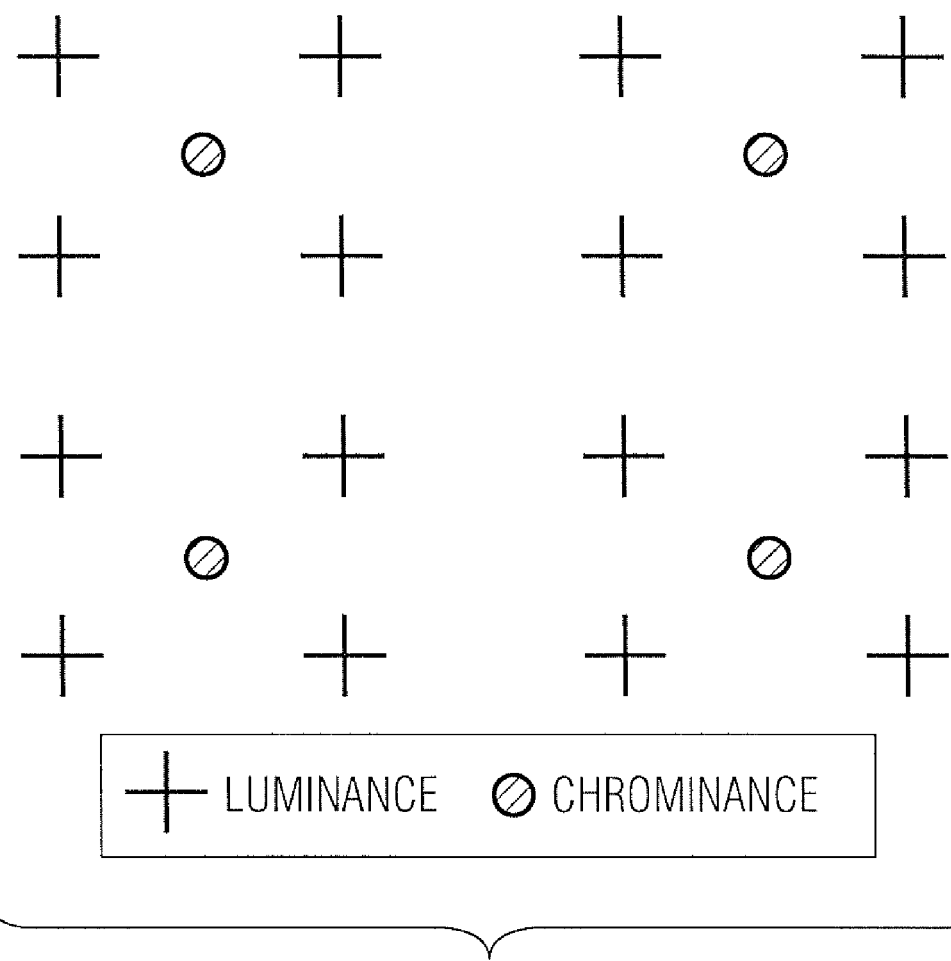
FIG. 1 illustrates a distribution of the chrominance and luminance components in the case of the 4:2:0 format.
Figure 3:
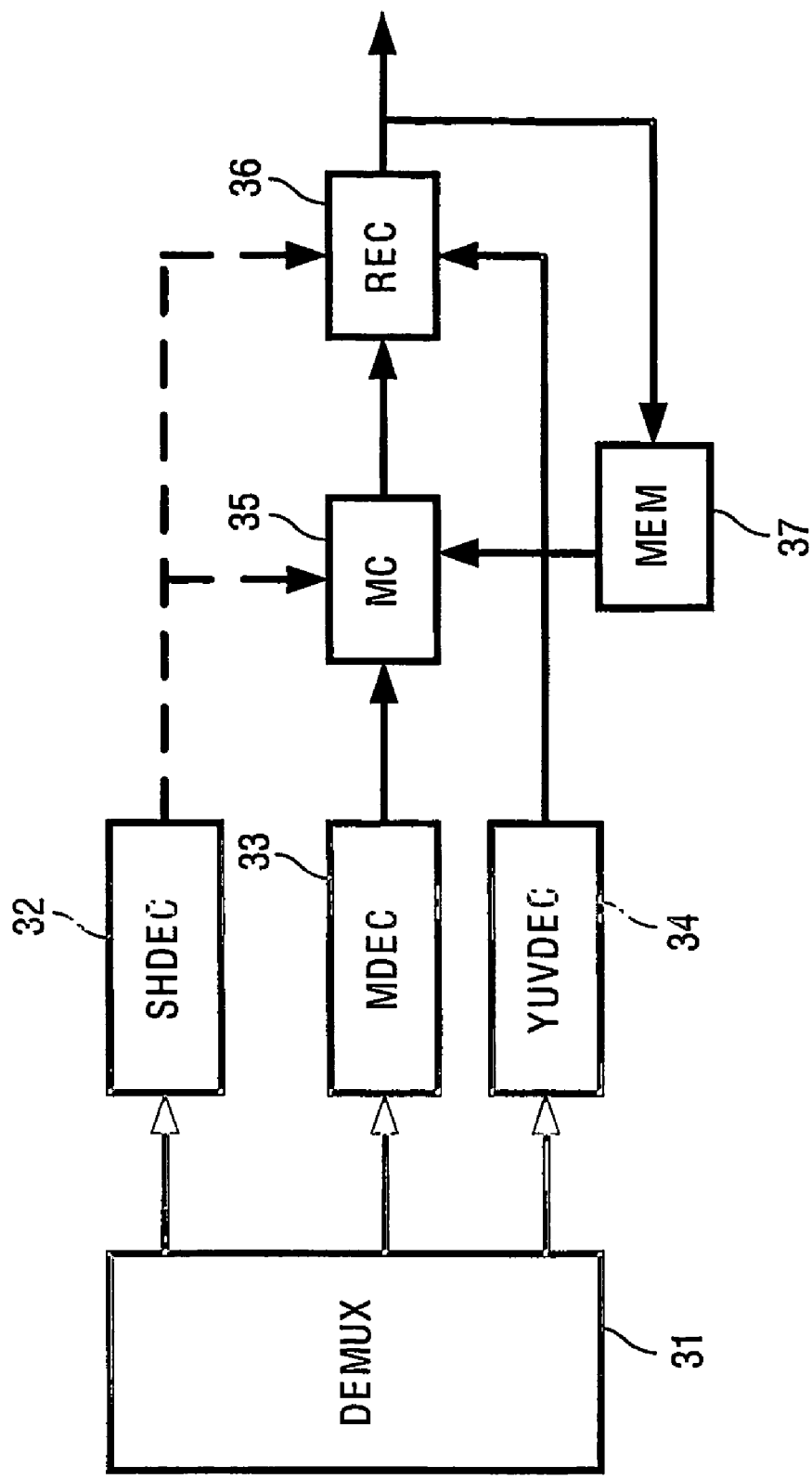
FIG. 3 is a block diagram of a decoder.

FIG. 3 represents a general overview of a decoder structure. The same decoding scheme is applied when decoding all the objects of a given session.

The decoder comprises a demultiplexer DEMUX (31), a shape decoder SHDEC (32), a motion decoder MDEC (33) and a texture decoder YUVDEC (34) for decoding the luminance and chrominance components. The reconstructed object is obtained by the right combination of the shape, texture and motion information thanks to a motion compensation circuit MC (35), a reconstruction circuit (36) and a picture memory MEM (37), according to a principle known to a person skilled in the art.

After the decoding of the different objects of a given session, an inverse affine transform, such as rotation, a zoom or a reduction for example, is applied on each object of a scene. To this end, a well-known technique called <<backward mapping>> is used. The inverse affine transform is applied on the coordinates (x,y) of each pixel of said image. The luminance, chrominance and transparency components of a pixel of the current object are then obtained by an interpolation, a bilinear interpolation for example, between four pixels that are surrounding the inverse transformed pixel having coordinates (X,Y).

After the inverse affine transform, the blending step also called composition is performed. The objects are recursively blended in a predetermined order.

In this step, a transparency value is associated to each object of the scene. Practically, it permits to see which object is behind or in front of another object. Each object has its own luminance Y, chrominance U and V, and transparency alpha values. Blending is done sequentially. Usually, the objects are composed two by two beginning by those on the backward of a scene. For example, if a first object N is over-layered over a second object M to generate a blended object P. The YUV pixel values of the blended object P depend on those of the objects M and N and on the transparency value of the current object N. Hence:

$$Py=[(255-Nalpha\_y)*My+Nalpha\_y*Ny]/255$$

$$Puv=[(255-Nalpha\_uv)*Muv+Nalpha\_uv*Nuv]/255$$

where:

Py and Puv are the luminance Y and chrominance UV components, respectively, of the blended object P, My and Muv are the luminance Y and chrominance UV components, respectively, of the second object M, which is for example the background of the scene, and which has been computed in a preceding blending step and memorized, Ny, Nuv are the luminance Y and chrominance UV components, respectively, of the first object N being processed, Nalpha_y and Nalpha_uv are the transparency components applied to the pixels of an object N in order to obtained the Py and Puv components, respectively, the luminance value is comprised between 0 and 255.

A transparency component Nalpha is the product of three terms:

a global alpha value, which is applied to all the pixels of an object, some gray-alpha values, one value being associated with one pixel, some binary shape values, one value being associated with one pixel.

Note that the transparency and the shape components have the same resolution as the luminance.

More particularly, the luminance component of a blended object P is generated from the corresponding luminance components of the first and second objects N and M and from a first composition function. The chrominance component of the blended object P is generated from the corresponding chrominance components of the first and second objects N and M and from a second composition function.

Thus, the transparency Nalpha_y of the luminance component is function of the first composition function, and the transparency Nalpha_uv of the chrominance component is function of the second composition function. Advantageously, the second composition function depends on a set of associated values of the first composition function. It permits to be more precise in the computation of the chrominance component Puv.

According to a first non-limited embodiment of the invention, the first composition function is based on a binary shape component and the transparency component Nalpha_uv is the product of global-alpha value, gray-alpha value and a shape value Shape_uv(x,y).

In this case, the second composition function is an OR of the shape of the corresponding four pixels such that:

Shape_uv(x,y)=Shape_y(2x−1,2y−1) OR Shape_y(2x,2y−1) OR Shape_y(2x−1,2y) OR

Shape_y(2x,2y) if pixels are numbered starting from 1.

For example for the current pixel whose coordinates are (x,y)=(2,1), the second composition function is:

Shape_uv(2,1)=shape_y(3,1) OR shape_y(4,1) OR shape_y(3,2) OR shape_y(4,2), the different shapes values Shape_y( ) taking the values 0 or 1. Hence, the chrominance value is taken into account if at least one luminance value is taken into account, i.e. belongs to the object N.

With this second composition function, the resulting blended object "e" of FIG. 2c has a much better quality, as it is the original "e".

As for the gray-alpha value of the transparency Nalpha_uv, one can take either the current pixel gray-alpha value:

gray_alpha_uv(x,y)=gray_alpha_y(2x−1,2y−1), or one can take the gray-alpha value of the four associated pixel, such that:

gray-alpha_uv(x,y)=[gray-alpha_y(2x−1,2y−1)+gray-alpha_y(2x,2y−1)+gray-alpha_y(2x−1,2y)+gray-alpha_y(2x,2y)]/4.

According to a second non-limited embodiment of the invention, the first composition function is based on the transparency component.

In this case, the second composition function is an average of the transparency of four associated pixels such that:

Nalpha_uv(x,y)=[Nalpha_y(2x−1,2y−1)+Nalpha_y(2x,2y−1)+Nalpha_y(2x−1,2y)+Nalpha_y(2x,2y)]/4

It is to be noted that the average can be computed in a different way, for example using weighting coefficient.

As the value of the transparency is comprised between 0 and 255, the result gives a better precision than if only the shape is used as in the first embodiment.

It is to be understood that the present invention is not limited to the aforementioned embodiments and variations and modifications may be made without departing from the spirit and scope of the invention as defined in the appended claims. In the respect, the following closing remarks are made.

It is to be understood that the present invention is not limited to the aforementioned video application on mobile phone. For example it can be applied on a television whenever there are some text message and video.

It is to be understood that the method according to the present invention is not limited to the aforementioned implementation.

There are numerous ways of implementing functions of the method according to the invention by means of items of hardware provided that a single item of hardware may carry out several functions. It does not exclude the possibility that an assembly of items of hardware may carry out a function, thus forming a single function without modifying the method for composing a scene in accordance with the invention.

The hardware item can be implemented in several manners, such as by means of wired electronic circuits or by means of an integrated circuit. The integrated circuit can be contained in a computer or in an encoder. In the second case, the decoder may comprise a luminance generation means for generating a luminance component of the blended object from the corresponding luminance components of the first and second objects and from a first composition function, and chrominance generation means for a generating chrominance component of the blended object from the corresponding chrominance components of the first and second object and from a second composition function, the second composition function depending on a set of values of the first composition function, as described previously, said means being hardware items as above stated.

The integrated circuit comprises a set of instructions. Thus, said set of instructions contained, for example, in a computer programming memory or in a decoder memory may cause the computer or the decoder to carry out the different steps of the composing method.

The set of instructions may be loaded into the programming memory by reading a tangible data carrier such as, for example, a disk.

Any reference sign in the following claims should not be construed as limiting the claim. It will be obvious that the use of the verb "to comprise" and its conjugations do not exclude the presence of any other steps or elements besides those defined in any claim. The article "a" or "an" preceding an element or step does not exclude the presence of a plurality of such elements or steps.

The invention claimed is:

1. A method of using a decoder to blend a first object with a second object, thereby resulting in a blended object, each object comprising chrominance and luminance components, a chrominance value being associated with a set of at least two luminance values, wherein said method comprises:
   using the decoder to generate the luminance component of the blended object from the corresponding luminance components of the first object and the second object, and from a first composition function, the first composition function based upon at least a transparency component Nalpha y of the luminance component of the first object; and
   using the decoder to generate the chrominance component of the blended object from the corresponding chrominance components of the first object and the second object, and from a second composition function, the second composition function depending on a set of associated values of the first composition function and based upon at least a transparency component Nalpha uv of the chrominance component of the first object.

2. The method of claim 1, wherein the chrominance value is associated with four luminance values and four transparency values, the second composition function being an average of the four transparency values.

3. The method of claim 1, wherein the first composition function depends on a shape component.

4. The method of claim 3, wherein the chrominance value is associated with four luminance values and four shape values, the second composition function being an 'OR' function between the four associated shape values.

5. A decoder that blends a first object with a second object, thereby producing a blended object, each object comprising chrominance and luminance components, a chrominance value being associated with a set of at least two luminance values and at least one transparency value, said decoder comprising:
   luminance generation means for generating a luminance component of the blended object from the corresponding luminance components of the first object and the second object, and from a first composition function, the first composition function based upon at least a transparency component Nalpha y for the luminance component of the first object, and
   chrominance generation means for generating the chrominance component of the blended object from the corresponding chrominance components of the first object and the second object, and from a second composition function, the second composition function depending on a set of associated values of the first composition function and based upon at least a transparency component Nalpha uv for the chrominance component of the first obect.

6. The decoder of claim 5, wherein each transparency component is a product of a global alpha value, at least one gray alpha value, and at least one binary shape value.

7. A decoder comprising:
   a demultiplexer coupled to at least a first object and a second object, the first object and the second object comprising chrominance and luminance components;
   a shape decoder coupled to the demultiplexer;
   a motion decoder coupled to the demultiplexer;
   a texture decoder coupled to the demultiplexer;

a motion compensation circuit coupled to the shape decoder and the motion decoder;

a reconstruction circuit, coupled to the shape decoder, the texture decoder, and the motion decoder, the reconstruction circuit producing a blended object as an output signal; and a picture memory coupled to the reconstruction circuit that provides a feedback signal to the motion compensation circuit, wherein:

the luminance component of the blended object is generated from the corresponding luminance components of the first and second objects and from a first composition function, the first composition function based upon at least a transparency component Nalpha_y for the luminance component of the first object, and the chrominance component of the blended object is generated from the corresponding chrominance components of the first object and the second object, and from a second composition function, the second composition function depending on a set of associated values of the first composition function and based on at least a transparency component Nalpha_uv for the chrominance component of the first object.

8. The method of claim 1, wherein each transparency component is a product of a global alpha value, at least one gray alpha value, and at least one binary shape value.

9. The decoder of claim 7, wherein each transparency component is a product of a global alpha value, at least one gray alpha value, and at least one binary shape value.

* * * * *